United States Patent [19]

Fujimoto et al.

[11] Patent Number: 4,660,517
[45] Date of Patent: Apr. 28, 1987

[54] VIBRATION DETECTING APPARATUS FOR MULTI-ROTOR ROTARY PISTON ENGINES

[75] Inventors: Yoriaki Fujimoto; Hiroshi Sasaki; Yukihiro Karimata, all of Hiroshima, Japan

[73] Assignee: Mazda Motor Corporation, Hiroshima, Japan

[21] Appl. No.: 812,640

[22] Filed: Dec. 23, 1985

[30] Foreign Application Priority Data

Dec. 28, 1984 [JP] Japan ............... 59-201274[U]

[51] Int. Cl.⁴ ............................................. F02B 53/12
[52] U.S. Cl. ........................................ 123/210; 73/35; 123/425
[58] Field of Search ............... 123/210, 211, 242, 425, 123/435; 73/35

[56] References Cited

U.S. PATENT DOCUMENTS 4,475,508 10/1984 Okada ................................. 123/425
4,572,122 2/1986 Kamai et al. ................... 123/425 X
4,574,616 3/1986 Miura et al. ............................ 73/35

FOREIGN PATENT DOCUMENTS 58-70056 4/1983 Japan .

Primary Examiner—Stephen F. Husar
Attorney, Agent, or Firm—Fleit, Jacobson, Cohn & Price

[57] ABSTRACT

A vibration detecting apparatus including a vibration detector for detecting engine vibrations in a multi-rotor rotary piston engine. The vibration detector is disposed on an intermediate housing, on both sides of which working chambers of the multi-rotor piston engine are formed. The vibration detector is located so that it has a sensitivity to vibration in the direction substantially perpendicular to the side surface of the intermediate housing, and parallel to the axial direction of the eccentric shaft which carries the rotors. By the above arrangement of the vibration detector, the vibrations are precisely detected. In response to the detected vibrations, it is possible, for example, to control engine knocking.

9 Claims, 5 Drawing Figures

4,660,517

VIBRATION DETECTING APPARATUS FOR MULTI-ROTOR ROTARY PISTON ENGINES

BACKGROUND OF THE INVENTION

1. Field of the Invention

The present invention relates to a vibration detecting apparatus, and particularly to a vibration detecting apparatus for detecting vibration in multi-rotor rotary piston engines.

2. Description of Prior Art

It is common in the art of the reciprocating engines to locate a vibration detector on a cylinder housing to detect engine vibrations and produce an engine vibration signal so that an ignition period is controlled in response to the engine vibration signal to prevent knocking. As disclosed in Japanese patent application No. 56-169643 which was filed on Oct. 23, 1981, and disclosed for public inspection on Apr. 26, 1983, under the disclosure No. of 58-70056, and Japanese patent application No. 56-199044, which was filed on Dec. 10, 1981, and disclosed for public inspection on June 16, 1983, under the disclosure No. of 58-101224, it is preferable to locate a vibration detecter on the side wall of the cylinder housing at which engine vibrations are generated most strongly. In locating the vibration detector, it is also preferable that it has a sensitivity to vibrations in the direction substantially perpendicular to the side wall surface of the cylinder in order to detect the engine vibrations precisely.

As in the case of reciprocating engines, it is also recommendable even in rotary piston engines to detect engine vibrations by means of a vibration detector for the purpose of controlling the ignition timing. However, the prior art does not teach anything with respect to the manner of detecting vibrations in rotary piston engines.

Since rotary piston engine are very different from reciprocating engines in construction, and further in conditions of generation and transmission of vibration, the conventional art as used in the reciprocating engines cannot be adapted as it is for the purpose of precise and accurate detection of vibrations in rotary piston engines.

SUMMARY OF THE INVENTION

As the results of extensive investigations on the mechanisms of generation and transmission of vibrations in multi-rotor rotary piston engines, the inventors have found that engine vibration are generated most strongly in the intermediate housing which is positioned between the front and rear rotor housings and has side surfaces along which the rotors is adapted to slidably move. It has been found particularly that the vibrations are produced most strongly in the direction perpendicular to the side surfaces of the intermediate housing.

The inventors have further made investigations to find the reason why vibration are generated most strongly in the direction normal to the side wall surfaces of the intermediate housing. For that purpose, mechanisms of generation and transmission of vibration in the rotary piston have been analyzed. In operations of rotary piston engines, combustion of an air-fuel mixture takes place in the working chambers, and as the result of such combustion pressure waves are produced. The pressure waves strike against the inner walls of the housings and generate surface vibrations in these housings. In the case of a side housing, such surface vibrations are transmitted from the inner wall to the outer wall. It should, however, be noted that an intermediate housing is cyclically and alternately subjected to the pressure waves at both side surfaces so that the surface vibrations are generated at both side surfaces. Thus, the vibrations generated in the intermediate housing are stronger than those generated in the other housings in which the vibrations are generated only at one surface. It is further understood that due to the mechanism of generation, the vibration become most strong in the direction normal to the side wall surfaces on which the rotors slide.

The present invention has been accomplished based on these findings. An object the present invention is therefore to provide a vibration detecting means for a multi-rotor rotary piston engine.

Another object is to provide a vibration detecting apparatus which can detect vibration accurately in multi-rotor rotary piston engines. A further object is to position a vibration detector on multi-rotor rotary piston engine in a manner that it can detect engine vibration with the highest sensitivity.

SUMMARY OF THE INVENTION

According to the present invention, the above and other objects can be accomplished in a multi-rotor rotary piston engine including a plurality of rotor housings each having an inner wall surface of a two-lobe trochoidal configuration, an intermediate housing having opposite side surfaces and located between two adjacent ones of said rotor housings, a pair of side housings attached to outer surfaces of the outermost rotor housings, a plurality of rotors which are disposed in respective ones of said rotor housings and carried by an eccentric shaft, vibration detecting means mounted on said intermediate housing for detecting engine vibrations, said vibration detecting means being located so that it has a sensitivity in the direction substantially perpendicular to said side surface of said intermediate housing. Since the mounting position and the direction of sensitivity of the vibration detecting means are consistent with the position where the strongest vibrations are generated in the housings of the multi-rotor rotary piston engine and the direction of the vibration, it can provide an accurate and sensitive detection of such vibrations.

The vibration detecting means may have weight means movable in the direction perpendicular to said side surface of said intermediate housing means, and means for detecting the movement of said weight means to produce a weight movement signal. It is desirable that the vibration detecting means is located on the intermediate housing at a position corresponding to the working chamber. Output signals from the vibration detecting means may be effectively utilized for preventing knocking of the engine.

The above and other objects and features of the present invention will become apparent from the following description of a preferred embodiment taking reference to the accompanying drawings.

DESCRIPTION OF THE PREFERRED EMBODIMENT

Figure 1:
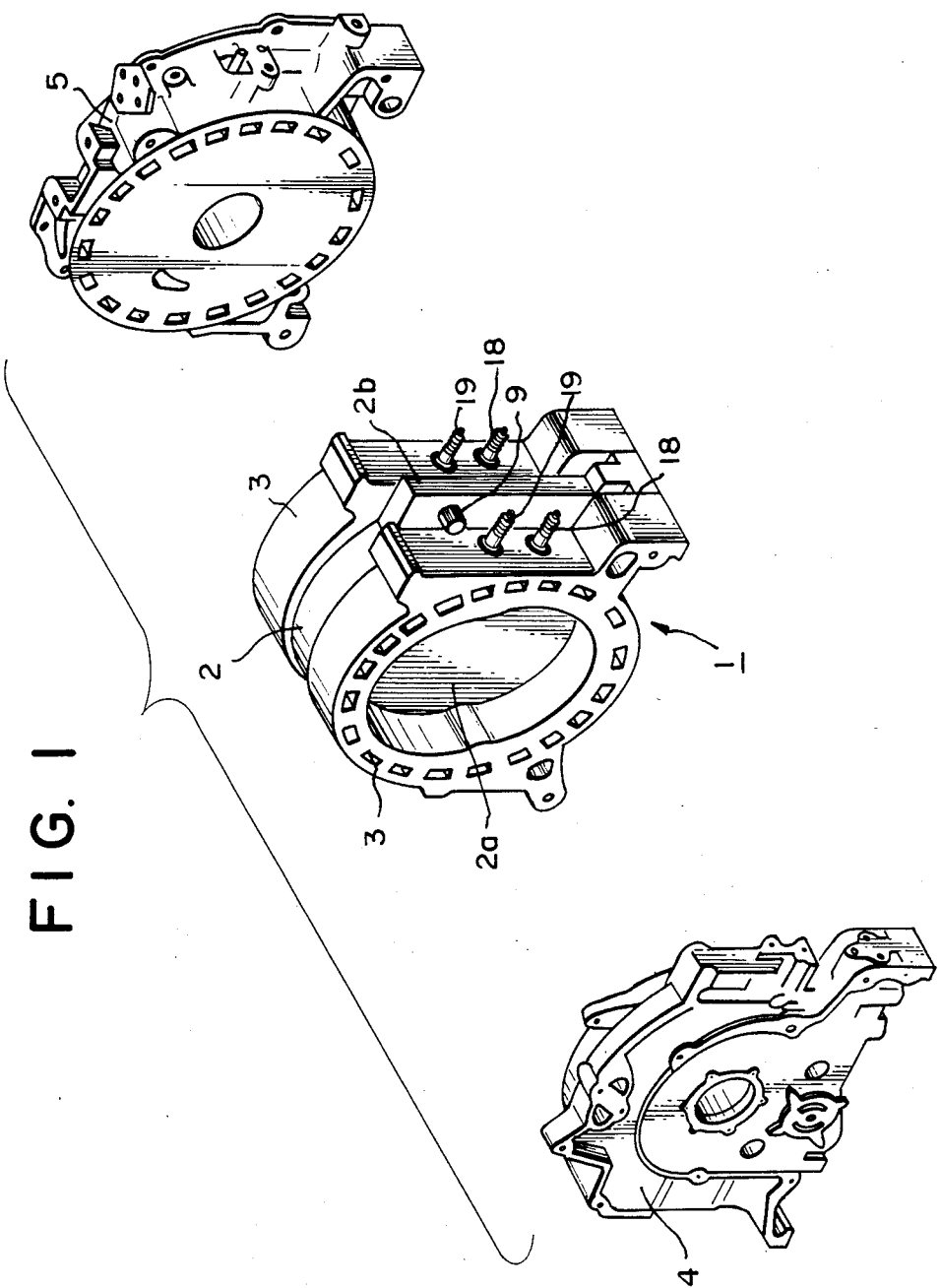
FIG. 1 is an exploded perspective view of a multi-rotor rotary piston engine in which a vibration detector is incorporated in accordance with one embodiment of the present invention.
Figure 2:
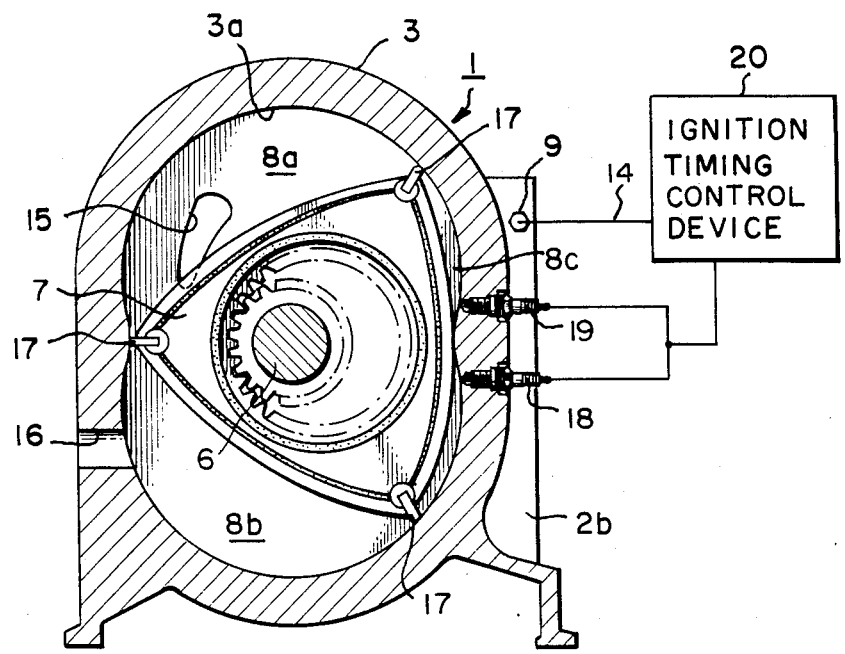
FIG. 2 is a cross-sectional view of the rotary piston engine of FIG. 1.
Figure 3:
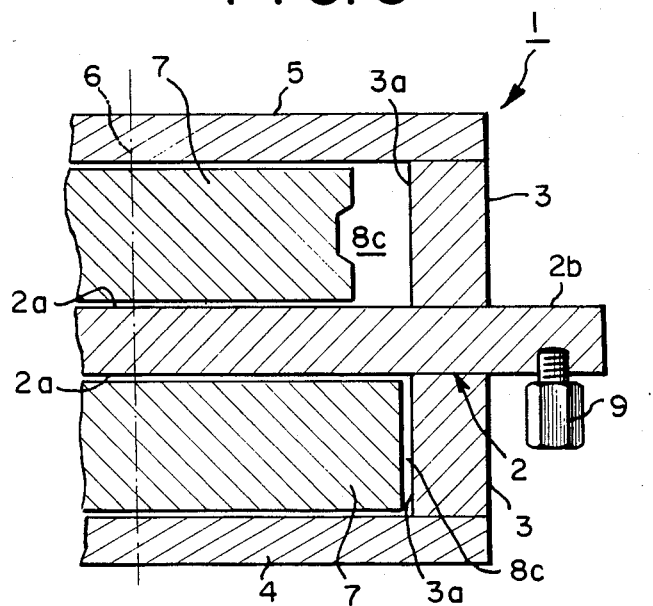
FIG. 3 is a fragmentary, longitudinal sectional view of a portion of the rotary piston engine adjacent to the vibration detector mounting portion.

Referring now to the drawings, particularly to FIGS. 1, 2 and 3, there is shown a multi-rotor rotary piston engine having a casing 1 which is constituted by an intermediate housing 2 disposed at a central portion as seen in a fore and aft direction. Front and rear rotor housings 3, 3 are disposed on opposite sides of the intermediate housing 2, each rotor having having an inner wall surface 3a of a two-lobe trochoidal configuration. Front and rear side housings 4 and 5, respectively, are disposed on the outer side surfaces of the rotor housings 3, 3, which are the sides opposite to the intermediate housing 2.

In the casing 1, there are two rotors 7, 7, which are carried by an eccentric shaft 6 extending longitudinally through the casing 1, for planetary rotating movement in the rotor housings 3, 3 with apex portions in sliding contact with the inner walls 3a, 3a.

Each of the rotors 7, 7 defines three working chambers 8a, 8b, 8c in each of the rotor housings 3, 3, the volumes of which cyclically change as the rotor rotates to conduct in sequence the intake, compression, combustion, expansion and exhaust cycles. The intermediate housing 2 cooperates with the front and rear housings 4 and 5 to provide rotor cavities for the rotors 7, 7. Accordingly, the opposite side surfaces 2a and 2a of the intermediate housings 2 provide sliding surfaces on which the rotors 7, 7 slidably move during the rotation thereof.

Considering here the mechanism of generation of vibrations in the rotary piston engine, the air-fuel mixture is subjected to combustion in a working chamber which is in the combustion cycle to generate pressure waves which then produce vibrations in the wall surfaces surrounding the working chamber. In the intermediate housing 2 of the aforementioned multi-rotor rotary piston engine, since such pressure waves are alternately generated in the front and rear working chambers 8c, 8c, the above-mentioned surface vibrations are generated at both side surfaces of the intermediate housing 2. Accordingly, the vibrations of the intermediate housing 2 of the multi-rotor rotary piston engine are stronger than those of the other housings.

Figure 5:
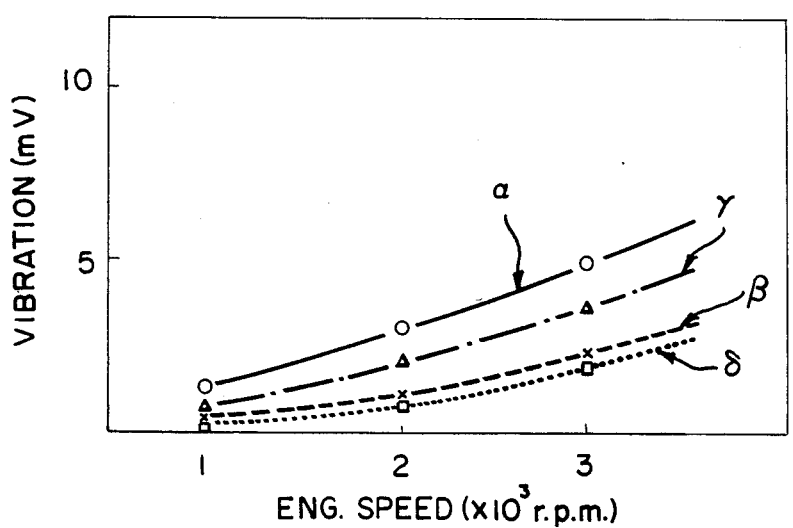
FIG. 5 is a diagram showing the results of vibration tests of the intermediate housing.

Furthermore, for the purpose of finding the direction in which the vibrations are generated most strongly in the intermediate housing 2, vibrations have been measured in the directions perpendicular and parallel to the side surface 2a of the intermediate housing 2. The results of this measurement are shown in FIG. 5, where a solid line α and a broken line β denote the values of measured vibrations in the direction perpendicular to the side surface 2a when engine knocking is generated and no engine knocking is generated, respectively, and a chain line γ and a dot line δ denote the values of measured vibrations in the direction parallel to the side surface 2a when engine knocking is generated and no engine knocking is generated, respectively. As will be understood from FIG. 5, in both cases where engine knocking is and is not generated, the vibrations in the direction perpendicular to the side surface 2a are stronger than those in the direction parallel to the side surface 2a.

Figure 4:
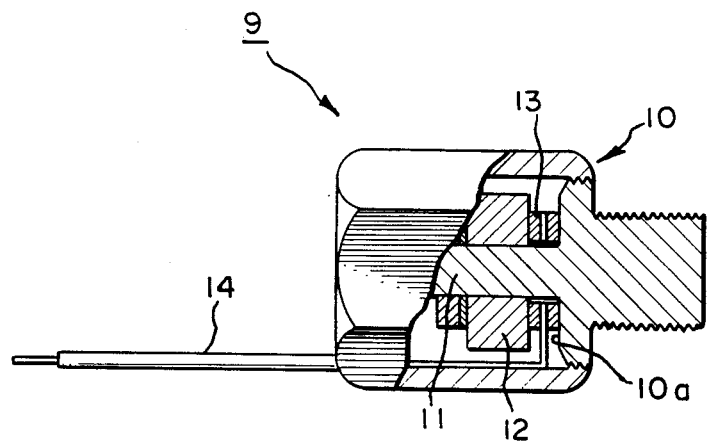
FIG. 4 is a partially broken side view of the vibration detector.

In accordance with the results of this investigation, in the embodiment illustrated, the intermediate housing 2 is provided with an external projection 2b projecting from the outer peripheral surface thereof, and a vibration detector 9 is mounted on the projection 2b for detecting vibrations of the intermediate housing 2. As shown in FIG. 4, the vibration detector 9 is provided with a casing 10 in threaded engagement with the projection 2b, an annular weight 12 fitted to a support pole 11 formed on a base surface 10a of the casing 10 and projecting therefrom, and a pressure sensitive device 13 disposed between the weight 12 and the base surface 10a of the casing and comprising, for example, a piezoelectric device so that it detects engine vibrations by detecting the pressure applied to the pressure sensitive device 13 by the weight 12 in response to the engine vibration. The pressure applying direction on the vibration detecting direction, or the sensitive direction of the pressure sensitive device 13, or of the vibration detector 9, is orientated in the direction substantially perpendicular to the side surface 2a of the intermediate housing 2, or substantially parallel to the axial direction of the eccentric shaft 6.

As shown in FIG. 2, the side housing for each rotor 7, namely the front housing 4, the rear housing 5 or the intermediate housing, is formed with an intake port 15 through which intake air from an intake passage (not shown) is supplied to the working chamber 8a for the intake cycle. Each of the rotor housings 3, 3 is formed with an exhaust port 16 through which the exhaust gas from the working chamber 8b for the exhaust cycle is exhausted to an exhaust passage (not shown). Each of the rotors 3, 3 is provided at each apex portion with an apex seal 17 which is maintained in sliding engagement with the inner wall 3a of the rotor housing 3.

Leading and trailing side ignition plugs 18 and 19 are mounted on a portion of each rotor housing 3 on the working chamber 3b for the combustion cycle. The ignition plugs 18 and 19 are electrically connected with an ignition timing control device 20. The control device 20 is mainly comprised of a microcomputer and connected with the vibration detector 9 via a lead line 14. The control device 20 receives an engine vibration signal from the vibration detector 9 and controls the ignition timing of the ignition plugs 18, 19 to prevent engine knocking. It is preferred that the vibration detector 9 is disposed on a part of the intermediate housing 2 on the working chamber 8c for the combustion cycle of the rotary piston engine, namely on a part of the intermediate housing on which the plugs 18, 19 are mounted, in order to enhance the accuracy of detection of engine vibration by the vibration detector. It is further preferred that the vibration detector 9 is disposed on the intermediate housing 2 on the trailing side in the rotor rotation direction from the trailing side ignition plug 19.

The present invention has thus been shown and described with reference to a specific embodiment in which the vibration detecting apparatus is incorporated into a two-rotor rotary piston engine. However, it should noted that the apparatus can be incorporated into rotary piston engines having more than two rotors.

What is claimed is:

1. A multi-rotor rotary piston engine comprising a plurality of rotor housings each having an inner wall surface of a two-lobe trochoidal form, an intermediate housing having opposite side surfaces and located between two adjacent ones of the rotor housings, a pair of side housings attached to outer surfaces of outermost rotor housings, a plurality of rotors which are disposed in respective ones of the rotor housings and carried by an eccentric shaft, adjacent rotors each having a side surface adapted for sliding engagement with said side surfaces of said intermediate housing, vibration detecting means mounted on said intermediate housing for detecting engine vibrations, said vibration detecting means being orientated so that it has a sensitivity in the direction substantially perpendicular to said side surface of said intermediate housing.

2. A rotary piston engine in accordance with claim 1 in which said vibration detecting means has weight means movable in the direction perpendicular to said side surface of said intermediate housing, means for detecting movements of said weight means and producing weight movement signals.

3. A rotary piston engine in accordance with claim 1 in which said vibration detecting means is provided on a part of said intermediate housing adjacent to a combustion chamber of said rotary piston engine.

4. A multi-rotor piston engine in accordance with claim 3 in which said vibration detecting means is provided adjacent to a trailing portion of said combustion chamber, said trailing portion being defined as a rear portion of the combustion chamber relative to the rotor rotation direction of said rotary piston engine.

5. A multi-rotor rotary piston engine in accordance with claim 4 in which said combustion chamber has a trailing portion and a leading portion and includes ignition plug means including a trailing portion ignition plug and a leading portion ignition plug, said leading portion being defined as a front portion of the combustion chamber relative to the rotor rotation direction, and said vibration detecting means is provided rearwardly of said trailing portion ignition plug, relative to the rotor rotation direction.

6. A multi-rotor rotary piston engine in accordance with claim 1 in which said intermediate housing has a projection externally projecting from the outer peripheral surface thereof, and said vibration detecting means is mounted on said projection.

7. A multi-rotor rotary piston engine in accordance with claim 1 in which output signals from said vibration detecting means are utilized for controlling the ignition timing of ignition plug means of said rotary piston engine.

8. A multi-rotor rotary piston engine, including a plurality of rotor housings, an intermediate housing having opposite side surfaces and located between two adjacent ones of the rotor housings, a pair of side housings attached to outer surfaces of said outermost rotor housings, a plurality of rotors which are disposed in respective ones of the rotor housings and carried by an eccentric shaft, adjacent rotors each having a side surface adapted for sliding engagement with said side surfaces of said intermediate housing, vibration detecting means mounted on said intermediate housing for detecting engine vibrations, said vibration detecting means being orientated so that it has a sensitivity substantially parallel to the axial direction of said eccentric shaft, and said vibration detecting means being provided adjacent to a trailing portion of said combustion chamber, said trailing portion being defined as a rear portion of the combustion chamber relative to the rotor rotation direction of said rotary piston engine.

9. A multi-rotor rotary piston engine in accordance with claim 8 in which said intermediate housing has a projection externally projecting from the outer peripheral surface thereof, and said vibration detecting means is mounted on said projection.

* * * * *